United States Patent [19]

Courty et al.

[11] 4,088,736

[45] May 9, 1978

[54] PROCESS FOR PURIFYING A GAS CONTAINING HYDROGEN SULFIDE AND CONTACT MASSES USABLE THEREFOR

[75] Inventors: Philippe Courty, Colombes; André Deschamps, Noisy-le-Roi; Sigismond Franckowiak; André Sugier, both of Rueil-Malmaison, all of France

[73] Assignee: Institut Francais du Petrole, Rueil-Malmaison, France

[21] Appl. No.: 641,352

[22] Filed: Dec. 16, 1975

[30] Foreign Application Priority Data

Dec. 27, 1974 France ................................. 74 43202

[51] Int. Cl.² ............................................. B01D 53/34
[52] U.S. Cl. ..................................... 423/230; 423/244;
423/539; 423/574 R; 252/192; 252/455 R;
252/457; 252/475
[58] Field of Search ............... 423/210, 539, 230, 574,
423/244; 252/473, 457, 475, 189, 192, 455 R

[56] References Cited

U.S. PATENT DOCUMENTS

| 2,037,789 | 4/1936 | Ipatieff ............................. 423/230 X |
| 2,037,790 | 4/1936 | Ipatieff ............................. 423/230 X |
| 2,442,982 | 6/1948 | Nachod ............................. 423/230 X |
| 3,441,370 | 4/1969 | Gutmann et al. .................... 423/244 |
| 3,943,226 | 3/1976 | Difford ................................. 423/230 |

FOREIGN PATENT DOCUMENTS 71-39,081  11/1971  Japan .................................... 423/230

Primary Examiner—Earl C. Thomas
Attorney, Agent, or Firm—Millen & White

[57] ABSTRACT

A process for purifying a hydrogen sulfide containing gas, which comprises absorbing said hydrogen sulfide onto a mass comprising zinc oxide, alumina and a group II A metal oxide, a large proportion of the group II A metal oxide being in the form of aluminate or silicoaluminate; then regenerating the mass by passing an oxygen containing gas therethrough.

15 Claims, No Drawings

PROCESS FOR PURIFYING A GAS CONTAINING HYDROGEN SULFIDE AND CONTACT MASSES USABLE THEREFOR

The invention relates to the use of solid contact materials for selectively absorbing sulfur compounds present in gases, particularly hydrogen sulfide, carbon disulfide and carbon oxysulfide.

Many industrial gases contain hydrogen sulfide, for example the effluents from the Claus reaction, the synthesis gases, natural gas and hydrocarbon charges for steam-reforming, hydrogen production or production of synthesis gas by controlled oxidation.

Well-known processes for removing $H_2S$ from gas are wet processes operated within a liquid phase, for example an alkanolamine solution. This technique obliges to cool the gas to a temperature below its dew point, which results in water purge problems in addition to technological difficulties. The presence of large amounts of $CO_2$ in the gasification effluents, which $CO_2$ is absorbed during purification, does not facilitate the further conversion of $H_2S$ to sulfur, and even strongly increases the cost of this operation when the removal of $CO_2$ from the gas is not necessary.

The use of zinc oxide for selectively retaining hydogen sulfide at a temperature of about 300° – 400° C has already been proposed, but the contact materials used up to now did not satisfy the following requirements:

high absorption rate and absorption velocity for $H_2S$ and, when present, COS and $CS_2$,
possibility to regenerate the contact material several times without appreciable loss of the absorption power with respect to the sulfur compounds and without reduction of the mechanical strength.

The solid contact materials to be used according to the invention for absorbing hydrogen sulfide and, when present, carbon sulfide and carbon oxysulfide, differ from the known contact materials by the fact that they are both thermally stable and regenerable. They quickly absorb substantial amounts of sulfur compounds.

These solid contact materials contain, by weight, 20 – 85% of zinc oxide, calculated as ZnO, 0.9 – 50% of alumina, calculated as $Al_2O_3$, and 2 – 45% of oxide of a group II A metal, calculated as oxide, with or without additional elements.

The additional elements may be, for example:
silica: 0.1 – 30% by weight
one or several oxides of the metal M (for example 0.1 – 10% by weight of these metals, calculated as oxide) preferably selected from the following ones: copper, cadmium, titanium, zirconium, vanadium, chromium, molybdenum, tungsten, manganese, iron, cobalt and nickel. These oxides make the absorption of $H_2S$, COS and $CS_2$ and the regeneration of the absorption material easier.

It has been observed that a content of zinc oxide lower than 20% by weight had a reduced industrial significance, due to an increased frequency of regeneration. Over 80% b.w. of ZnO, the mechanical strength decreases; the use of material containing more than 85% of ZnO must therefore be avoided, the most favourable contents being in the range of 25 – 80% b.w.

The best results are obtained, according to the invention, when material (A) contains, by weight, 25 – 80% of zinc oxide, 9 – 50% of alumina, 0.02 – 6% of silica, calculated as $SiO_2$, 3.5 – 26% of oxide of group II A metal and 0 – 10% of at least one oxide of metal M, the molar ratio of the oxide of group II A metal to both the aluminum and silicon oxides being from 0.3:1 to 2:1. These materials have a particularly high mechanical strength and their deactivation rate during the absorption/regeneration cycles remains very low. These materials may be obtained from a refractory aluminous cement as pointed out below.

The metal of group II A which has given the best results is calcium, but magnesium and/or barium may also be used.

According to a preferred embodiment, the contact material may be obtained by the successive following steps:

At least one zinc compound is first admixed with at least one aluminum compound and at least one compound of a group II A metal, preferably a calcium compound; the resulting mixture, after water addition, is malaxated to form a homogeneous paste; the latter is shaped, for example, by extrusion; the shaped product is dried and roasted at about 500° – 1000° C.

Other known methods for manufacturing solid materials may be used, for example agglomeration in a pill-shaper or spheroidisation of extrudates by passage through a pill-shaper at high speed.

The zinc compound may be zinc oxide obtained, for example, by oxidation of zinc metal vapor or by precipitation of zinc carbonate hydrate from a solution of a zinc salt and roasting of said carbonate to convert it to oxide. A zinc salt may also be used, for example, a nitrate or an acetate, and decomposed by heat during roasting.

When employing powdered zinc oxide, it is desirable that this zinc oxide be finely divided; the average size of the elemental particles is, for example, lower than $5\mu$ and, preferably, lower than $0.5\mu$. The amount of ZnO with respect to the activated contact material is 25 – 80% b.w.

Alumina may be used in the free state, for example, as alumina gel, or as heat-decomposable aluminum compound, for example a nitrate or a salt of a carboxylic acid.

The group II A metal is supplied, for example, as carbonate, oxide, hydroxide, nitrate, sulfate, chloride or carboxylate.

When using silica, alumina and silica may be supplied simultaneously, for example as clay, selected for example from the group consisting of kaolinite, bentonite, halloisite and attapulgite. A preferred composition (B), obtained from clay, contains, by weight, 25 – 80% of ZnO, 2 – 24% of $Al_2O_3$, 5 – 30% of $SiO_2$ and 3 – 30% of oxide of a group II A metal with 0.01 – 10% of oxides of metals M and a total of 15 – 60% of $Al_2O_3$ + $SiO_2$ + oxide of a group II A metal.

A compound of alumina, silica and calcium (or other alkaline earth metal or magnesium) may also be a cement such as Portland cement (average composition: 60 – 70% by weight of CaO, 5 – 10% b.w. of $Al_2O_3$ and 15 – 25% b.w. of $SiO_2$) or an aluminous cement (for example: 30 – 40% b.W. of Cao, 5 – 10% b.w. of $SiO_2$ and 40 – 50% b.w. of $Al_2O_3$). A preferred refractory aluminous cement is, for example, a SECAR cement, as produced by LAFARGE company, whose average composition is, for example:

| Binder | $Al_2O_3$ | CaO | $Fe_2O_3$ | FeO | $SiO_2$ | MgO | $K_2O$ |
|---|---|---|---|---|---|---|---|
| SECAR 150 | 50 | 27 | 5 | 1 | 5 | 0.2 | 0.05 |

-continued

|  |  |  |  |  |  |  |  |
|---|---|---|---|---|---|---|---|
| SECAR 250 | 70 | 26 | 0.1 | 0.2 | 0.2 | 0.2 | 0.05 |
| Super SECAR 250 | 80 | 19 | 0.1 | — | 0.1 | 0.05 | — |

| Binder | Na$_2$O | SO$_3$ | S | P$_2$O$_5$ | Mn$_2$O$_3$ | Cr$_2$O$_3$ | TiO$_2$ |
|---|---|---|---|---|---|---|---|
| SECAR 150 | 0.05 | 0.05 | 0.05 | 0.10 | 0.02 | 0.10 | 3 |
| SECAR 250 | 0.5 | 0.03 | 0.01 | 0.05 | 0.005 | 0.002 | 0.003 |
| Super SECAR 250 | 1.0 | 0.05 | 0.01 | 0.05 | 0.005 | 0.003 | 0.003 |

One of the above preferred materials (A) may thus be obtained.

When additional elements M must be added to the contact material, these elements or their precursors may be either admixed with the other ingredients during the above mixing or malaxating, or added later, for example by impregnating with a solution containing these elements.

The additional elements may be used, for example, as oxides, hydroxides or salts which can be thermally decomposed when thermally activating the contact material, for example nitrates, acetates, oxalates, citrates or tartrates.

The present process for the reversible recovery of gaseous sulfur compounds may be operated in the preferred following conditions:

ABSORPTION STEP temperature of 200° – 800° C, particularly 300° – 650° C,

VVH (volume of gas per volume of absorption material per hour): 50 – 20,000, preferably 100 – 10,000.

STEP OF REGENERATION BY MEANS OF AN OXYGEN CONTAINING GAS temperature of 400° – 1200° C, preferably 450° – 900° C, free oxygen content of the regeneration gas: 1 – 100% by volume, preferably 5 – 30%,

VVH: 100 – 10,000.

To avoid excessive temperature increase, when regenerating, a relatively low oxygen content will be selected.

The absorption materials may be used as fixed, movable or fluidized bed. According to a preferred embodiment at least two beds of material are used, one being used for absorption when the other is on regeneration.

The gaseous effluent from the regeneration step contains sulfur essentially as SO$_2$. This gas may have a relatively high content of SO$_2$ and be treated in known manner to extract SO$_2$ or convert it to other compounds. SO$_2$ may, for example, be oxidized to SO$_3$ in view of manufacturing sulfuric acid. SO$_2$ may also be converted to sulfur by reaction with H$_2$S. By way of example, when an effluent from a plant for gasifying solid, liquid or gaseous combustibles is treated according to the invention, this effluent containing at least 10% by mole of CO and/or hydrogen and sulfur compounds such as H$_2$S, COS and CS$_2$, a portion of the gas discharged from the reactor for absorption of the sulfur compounds may be collected and admixed with the gas discharged from the reactor under regeneration (SO$_2$ containing gas). A portion of the effluent from a gasification unit may also be collected and admixed with the gas discharged from the reactor under regeneration. In both cases, the mixture may be supplied to a catalyst for sulfur manufacture, for example bauxite or activated alumina, or to a catalyst for SO$_2$ reduction, for example an association of group VIII metals with group VI metals deposited on alumina, so as to produce a mixture of H$_2$S and SO$_2$ having a molar ratio H$_2$S/SO$_2$ of about 2, this mixture being then supplied to a sulfur producing plant.

Although the mechanism of absorption of the sulfur compounds is not known with certainty, it seems that the main reactions are:

Absorption: $ZnO + H_2S \rightleftarrows ZnS + H_2O$

Regeneration: $ZnS + 1.5\, O_2 \rightarrow ZnO + SO_2$

The process may be applied to the purification of a gas containing, for example, 1 – 50% by volume of steam, which is an economic advantage. In the presence of large amounts of steam, for example 20 – 50% by volume, it may be advantageous to carry out the absorption at the lowest temperature compatible with the activity of the absorption material. In some cases, it may also be advantageous to condense a portion of the steam in order to operate under more advantageous conditions.

It has been observed that the material employed according to the invention retained during the absorption and regeneration cycles a high content of active zinc (uncombined zinc), i.e., zinc able to absorb gaseous sulfur compounds such as H$_2$S. It may be estimated that, in this material, the tendency of zinc oxide to combine with other oxides, leading to inactive zinc compounds, is reduced.

The "active" zinc oxide content of said material may be determined by sulfurization of the material in the following conditions:

300 g of desulfurization material is treated for 10 hours at 500° C with 300 liters per hour of a gas containing:

1.8% H$_2$S
0.2% COS + CS$_2$
0.02% SO$_2$
35% H$_2$O
62.98% N$_2$

After absorption, the sulfur retained by the material is titrated by a chemical method. This sulfur amount, called "chemical absorption", is called S$_c$%.

The regeneration of the sulfurized material is performed by treating the latter for 10 h. at a temperature from 500° to 800° C with 300 liters/hour of a gas containing:

10 – 15% O$_2$
90 – 85% N$_2$ 300 to 500 successive absorptions and regenerations have been performed with the materials A, B, C, D, E, F, G whose manufacture is stated below.

During the 300th absorption, the chemical absorption S$_c$ has been accurately determined by measuring the gas feed rate and the H$_2$S, COS and CS$_2$ contents of the gas. It has been found that, in all cases, the loss of activity remained lower than 30%.

During the 300th regeneration, the amount of sulfur extracted has been accurately determined by absorbing the gas in an absorption column fed with a 1 M sodium hydroxide solution; this amount of sulfur is called S'r; it is experimentally found that $$\frac{S'r}{S'c} \geq 0.99$$

The following examples illustrate the invention but are not to be construed as limiting the same.

EXAMPLES 1 – 7

The manufacture of the contact materials A – F is first described. Contact material G is commercial zinc oxide as balls of 3 – 4.7 mm diameter, referenced ICI 32-4.

Its composition, after 3 hours heating at 600° C, is the following:

| | |
|---|---|
| ZnO | 90.1 |
| CaO | 2.8 |
| $Al_2O_3$ | 3.5 |
| $Fe_2O_3$ | 1.9 |
| $SiO_2$ | 0.8 |
| PbO | 0.4 |
| MgO | 0.4 |
| $CuO + Cr_2O_3 + Mn_2O_3 + Na_2O + NiO$ | 0.1 |

CONTACT MATERIAL A 124 g of zinc oxide (snow type B:, >99.0% ZnO, specific area: 6 m²/g, average particle size: 0.23μ Vieille-Montagne)

and 74 g of quick lime are admixed in a mixer with 58.5 g of kaolin from Britain; its loss of weight when roasted at 1000° C is 14.5%; its average composition (after roasting) is:

| | | |
|---|---|---|
| $Al_2O_3$ | 42.7 | % by weight |
| $SiO_2$ | 53.6 | " |
| $Fe_2O_3$ | 0.3 | " |
| $TiO_2$ | 3.35 | " |
| MgO | 0.05 | " |

The homogenized powder is treated with 150 ml of an aqueous solution containing 0.5% b.w. of Senegal gum (gum arabic from trees in the vicinity of the Senegal river). The paste obtained by damping is extruded as cylinders of 7 mm diameter and 5 – 10 mm length. The extrudates are dried at 100° C for 3 hours and then roasted for 3 hours at 600° C in open air. After roasting, the average composition of the activated material is the following:

| | | |
|---|---|---|
| ZnO | 50.00 | % by weight |
| CaO | 29.84 | " |
| $Al_2O_3$ | 8.60 | " |
| $SiO_2$ | 10.80 | " |
| $Fe_2O_3$ | 0.07 | " |
| $TiO_2$ | 0.68 | " |
| MgO | 0.01 | " |

290 g of extrudates of 7 mm diameter are obtained; their specific surface is 15 m²/g, their average crushing strength is higher than 1.5 kg per mm, as determined with an ERWEKA machine (a machine providing steel plates for sandwiching a catalyst particle at increasing pressures until breakage).

By X-diffraction analysis, it was found that zinc oxide is essentially uncombined. More than 90% of the calcium oxide is combined with alumina and silica, mainly as calcium aluminates and silico-aluminates.

Contact material B

There is successively introduced into a slubber-mixer: 146 g of basic zinc carbonate (71.5% ZnO), 2107 g of Portland cement (roasting loss at 800° C: 11%) of the composition given below, 600 g of titanium gel of 10% b.w. $TiO_2$ content and 15 g of finely divided cadmium oxide, obtained by roasting cadmium carbonate at 600° C.

It is damped with 1500 ml of water, then the material is homogenized by malaxating for 20 minutes and extruded to 6 mm diameter. The extrudates of 3 – 10 mm length are dried at 150° C for 3 h. and then roasted at 700° C for 1 hour.

2940 g of extrudates of 6 mm diameter are obtained; their mechanical strength, determined with an ERWEKA machine is higher than 1.5 kg/mm, their specific surface is 25 m²/g and their average composition is:

| | | |
|---|---|---|
| ZnO | 35.00 | % by weight |
| CaO | 40.62 | " |
| $SiO_2$ | 13.12 | " |
| $TiO_2$ | 2.00 | " |
| CdO | 0.50 | " |
| MgO | 1.25 | " |
| $Al_2O_3$ | 3.75 | " |
| $Fe_2O_3$ | 1.88 | " |
| $Na_2O$ | 0.62 | " |
| $SO_3$ | 1.25 | " |

Zinc oxide is essentially uncombined. More than 90% of calcium oxide is combined with silica and alumina.

Composition of the Portland cement (after loss by heating at 800° C for 3 hours)

| | | |
|---|---|---|
| CaO | 65.00 | % by weight |
| $Al_2O_3$ | 6.00 | " |
| $Fe_2O_3$ | 3.00 | " |
| $SiO_2$ | 21.00 | " |
| $Na_2O$ | 1.00 | " |
| $SO_3$ | 2.00 | " |
| MgO | 2.00 | " |

CONTACT MATERIAL C 1260 g of zinc oxide "snow type A" (>99.7% ZnO, specific area: 8m²/g, average particle size: 0.17μ) (Vieille-Montagne) is admixed with 58 g of barium carbonate, 12.9 g of strontium carbonate and 475 g of aluminous cement "LUMNITE" about 40% alumina, 40% lime, 15% iron oxide, 5% silica, and magnesia (loss by heating at 800° C: 9%), then supplied to a slubber-mixer and damped with 500 ml of an aqueous solution containing 210 g of cobalt nitrate and 1 g of methyl cellulose (methocel). The homogeneous paste thus obtained is extruded to cylinders of 5 mm diameter and 6 – 12 mm length. After drying at 100° C for 4 hours, then roasting at 630° C for 2 hours, there is obtained 1700 g of extrudates of 4.9 mm diameter; their mechanical strength, determined with an ERWEKA machine, is higher than 1.1 kg/mm, their specific surface is 15 m²/g and their average composition is:

| | | |
|---|---|---|
| ZnO | 70.00 | % by weight |
| CaO | 8.83 | " |
| Al$_2$O$_3$ | 9.86 | " |
| SiO$_2$ | 2.30 | " |
| Fe$_2$O$_3$ | 2.74 | " |
| MgO | 0.22 | " |
| SO$_3$ | 0.05 | " |
| SrCO$_3$ (as SrO) | 0.50 | " |
| BaCO$_3$ (as BaO) | 2.50 | " |
| Co$_3$O$_4$ (as CoO) | 3.00 | " |

Zinc oxide is uncombined. Calcium aluminate and calcium silico-aluminate (about 90% of the calcium) are present.

Composition of the aluminous cement LUMNITE after heating at 800° C for 3 hours.

| | | |
|---|---|---|
| CaO | 36.8 | % by weight |
| SiO$_2$ | 9.6 | " |
| Al$_2$O$_3$ | 41.1 | " |
| Fe$_2$O$_3$ | 11.4 | " |
| MgO | 0.9 | " |
| SO$_3$ | 0.2 | " |

CONTACT MATERIAL D 756 g of basic zinc carbonate of 71.5% ZnO content is malaxated with 10 g of zirconium oxide precipitate (90% ZrO$_2$), 155 g of refractory cement SECAR 150 and 160 g of refractory cement SECAR 250. 400 ml of an aqueous solution containing 0.9% b.w. of methylcellulose is then added. After homogenization, the paste is extruded to pieces of 6 mm diameter which are cut to pieces of 3 – 11 mm length. After ageing in the air for 24 hours (T = 18° – 24° C), drying for 20 hours at 150° C and roasting for 2 hours at 800° C, there is obtained 885 g of extrudates whose properties are as follows:

grain density: 1.97
pore volume: 30 ml/100 g
specific surface: 35 m$^2$/g

These extrudates are impregnated in a pill-shaper with 260 ml of an aqueous solution containing:

19.6 g ammonium metatungstate of 92.05% WO$_3$ content,
11.1 g of ammonium paramolybdate of 81.1% MoO$_3$ content,
70.1 g of nickel nitrate hexahydrate
and
10 g of citric acid monohydrate.

The extrudates are dried, then roasted at 600° C for 2 hours. Their mechanical strength, determined with an ERWEKA machine, is higher than 2 kg/mm. Their average composition is the following:

| | | |
|---|---|---|
| ZnO | 60.00 | % by weight |
| Al$_2$O$_3$ | 21.60 | " |
| CaO | 9.52 | " |
| Fe$_2$O$_3$ + FeO | 1.10 | " |
| SiO$_2$ | <1 | " |
| NiO | 2.00 | " |
| WO$_3$ | 2.01 | " |
| MoO$_3$ | 1.00 | " |

Calcium aluminate is present (90% of the calcium). The average composition of the cements SECAR 150 and SECAR 250 has been given above.

CONTACT MATERIAL E

There is admixed 852 g of active zinc oxide (Bayer) of 93.95% ZnO content, obtained by roasting zinc hydroxycarbonate, with 192 g of alumina gel (66.7% Al$_2$O$_3$), 6.7 g of silica gel (30% SiO$_2$) and 300 g of titanium gel (10% TiO$_2$).

The resulting wet powder is converted to a paste and then peptized with 1300 ml of a solution containing:

Ca (NO$_3$)$_2$, 4 H$_2$O : 126.8 g
Cr (NO$_3$)$_3$, 9 H$_2$O : 52.7 g

The peptized material is extruded to 4 mm in diameter (3 – 10 mm in length), aged for 12 hours in open air, dried for 3 hours at 150° C and then roasted at 720° C for 2 hours.

980 g of extrudates is obtained; their mechanical strength is 0.9 kg/mm, their specific surface 49 m$^2$/g and their average composition

| | | |
|---|---|---|
| ZnO | 80.00 | % by weight |
| Al$_2$O$_3$ | 12.80 | " |
| CaO | 3.00 | " |
| TiO$_2$ | 3.00 | " |
| Cr$_2$O$_3$ | 1.00 | " |

These extrudates contain calcium aluminate (more than 90% of the available calcium).

CONTACT MATERIAL F 919 g of transparent zinc oxide, i.e., zinc hydroxycarbonate of 70.7% ZnO content (Bayer) is admixed with 250 g of titanium gel (10% TiO$_2$) and 295 g of refractory Super Secar cement. 500 ml of an 1% methylcellulose aqueous solution is added; after homogenization the paste is extruded to pieces of 6 mm diameter and 5 – 10 mm length; the extrudates are aged for 24 hours in open air, dried at 120° C for 3 hours and then at 200° C for 1 hour, and finally roasted at 630° C for 1 hour.

The extrudates are impregnated in a pill-shaper with 300ml of an aqueous solution containing:

V$_2$O$_5$: 15 g
Oxalic acid: 28 g
Iron (III) nitrate nonahydrate: 76.2 g
Manganese nitrate tetrahydrate: 15.9 g
Citric acid: 5 g.

The impregnated extrudates are dried at 120° C for 2 hours and activated at 600° C for 2 hours. There is obtained 992 g of extrudates whose average composition is as follows:

| | | | | |
|---|---|---|---|---|
| ZnO | 65.00 | % by weight | Na$_2$O | : 2500 ppm |
| Al$_2$O$_3$ | 23.20 | " | SiO$_2$ | : 300 ppm |
| CaO | 5.51 | " | | |
| V$_2$O$_5$ | 1.50 | " | | |
| Fe$_2$O$_3$ | 1.51 | " | | |
| Mn$_2$O$_3$ | 0.50 | " | | |
| TiO$_2$ | 2.50 | " | | |

Calcium aluminate is present (about 90% of the available calcium).

The average composition of Super Secar has been given above.

The textural properties are:
Filling density: 1.10 metric ton/m$^3$
grain density: 1.05 g/ml
total pore volume: 27 ml/100 g
specific surface: 35 m$^2$g$^{-1}$ The examples 1 – 7 illustrate the use of these materials for the reversible absorption of hydrogen sulfide, carbon sulfide and carbon oxisulfide; tables I, II and III summarize these examples.

The experimental conditions for testing materials A to G are as follows:

| ABSORPTION (SULFURIZING) | REGENERATION (DESULFURIZING) |
|---|---|
| VVH : 1000 h$^{-1}$ | VVH : 1000 h$^{-1}$ |
| T : 300 – 800° C | T : 400 – 1000° C |
| Volume of the solid material : 300 ml | Volume of the solid material : 300 ml |
| Duration : 10 h | Duration : 10 h |
| Gas mixture : 300 liters/h. | Gas mixture : 300 liters/h. |
| % | % |
| $H_2S$  1.8 | $O_2$  10 – 15 |
| COS + $CS_2$  0.2 | $N_2$  90 – 85 |
| $SO_2$  0.02 | |
| $H_2O$  35.00 | |
| $N_2$  62.98 | |

Example 7 shows that the solid materials known in the art have not sufficient properties to be used according to the present invention: the contact material G is reduced to dust after the first regeneration carried out at 560° C for 10 hours.

EXAMPLE 8

135,000 Nm$^3$/hour (under normal conditions of temperature and pressure) of gas produced by gasification and whose composition by volume is as follows:

| $H_2S$ | 0.34% |
|---|---|
| CO | 16.61% |
| $H_2$ | 16.61% |
| $H_2O$ | 33.22% |
| $N_2$ | 33.22% | is feed of dust at about 600° C and then supplied to a reactor $R_1$ containing 154 metric tons of absorption material. This material has been prepared as follows:

The following materials have been admixed in an ALPINE crusher:

| ZnO : 60% b.w. | | |
|---|---|---|
| Aluminous cement : 5% b.w. (Lumnite) | | $Al_2O_3$ : 30.1% b.w. |
| Super Secar 250 cement : 35% b.w. | whose | CaO : 8.5% b.w. |
| | | $Fe_2O_3$ : 0.6% b.w. |
| | | various : 0.8% b.w. |

An aqueous solution of 0.5% b.w. methylcellulose content has been added thereto and the resulting mixture has been shaped to balls. These balls have been aged in steam at 80° C, then roasted at 600° C for 3 hours. Their average diameter is 6 mm (4 – 7mm). More than 90% of calcium is engaged as calcium aluminate or silicoaluminate.

There is thus recovered, at the outlet from the reactor, a gaseous effluent containing less than 200 ppm by volume of $H_2S$. It is used to feed a gas turbine.

After a 24 hours run, the gas to be treated is supplied to a reactor $R_2$ placed behind $R_1$, and $R_1$ is replaced by a reactor $R_3$ ($R_1$, $R_2$ and $R_3$ contain the same weight of the same absorption material).

$R_1$ is then regenerated by passing hot air through the zinc sulfide containing material. The temperature is about 800° C. The effluent discharged from the reactor contains 1.82% by volume of $SO_2$. It is used to supply heat to a heat exchanger placed on the air circuit feeding $R_1$ for regeneration.

An amount of gas purified according to the invention is admixed with the regeneration effluent and then passed to a reactor provided with 2 catalyst beds, respectively 6 m$^3$ of alumina containing 4% of $V_2O_5$ and 3.5% of $Fe_2O_3$ and 30 m$^3$ of alumina containing 5% of nickel oxide and 5% of molybdenum oxide.

The reaction is carried out at 450° C, and there is obtained a gas containing 1.11% of $H_2S$ and 0.48% of $SO_2$ by volume, together with water and inert gas.

This gas is first cooled to about 140° C, which produces sulfur which is separated, and then supplied to a reactor containing a packing where it meets, in countercurrent contact, a reaction mixture of polyethylene glycol 400 containing 6.4 g of sodium benzoate per kg of solvent, which is recycled downwards through the reactor. The reaction between the two acid gases produces sulfur which is separated. 608 kg of sulfur per hour has thus been formed. There is recovered at the outlet from the reactor a gas containing low amounts of acid gases, i.e., 3000 ppm by volume, water and inert gases.

It is recycled after light compression with the hot air employed for regenerating the absorption material.

A purge carried out before admission into the reactor containing the regenerable material permits to adjust the $H_2O$ and $N_2$ content of the plant.

| Example No | Contact Mass | % ZnO By Weight | Absorption Sulfurization of the Fresh Mass Temperature | Sc% | Regeneration Desulfurization No 50 Temperature | Absorption Sulfurization No 300 Temperature | Sc% | Regeneration Desulfurization No 300 Temperature |
|---|---|---|---|---|---|---|---|---|
| 1 | A | 50 | 550 | 10.1 | 600 | 550 | 7.7 | 610 |
| 2 | B | 35 | 600 | 7.2 | 560 | 600 | 5.18 | 580 |
| 3 | C | 70 | 400 | 14.1 | 530 | 400 | 11.3 | 560 |
| 4 | D | 60 | 500 | 12.3 | 560 | 500 | 9.72 | 570 |
| 5 | E | 80 | 450 | 16.0 | 600 | 450 | 13.20 | 610 |
| 6 | F | 65 | 450 | 13.2 | 500 | 450 | 10.55 | 500 |
| 7 | G | >90 | 400 | 20.1 | +++ | | | |

+++The balls are converted to dust after the first regeneration at 560° C for 10 hours; the operation must be interrupted at the end of the first cycle.

| | PHYSICAL AND MECHANICAL PROPERTIES OF THE MASS | | | |
|---|---|---|---|---|
| | FRESH MASS | | AFTER 300 CYCLES | |
| EXAMPLE | FILLING DENSITY T/m$^3$ | CRUSHING GRAIN TO GRAIN Kg/mm | FILLING DENSITY T/m$^3$ | CRUSHING GRAIN TO GRAIN Kg/mm |
| 1 | 1.10 | 1.7 | 1.15 | 1.5 |
| 2 | 1.25 | 1.6 | 1.25 | 1.2 |
| 3 | 1.20 | 1.3 | 1.25 | 1.1 |
| 4 | 1.10 | 2.1 | 1.15 | 1.9 |
| 5 | 1.05 | 1.1 | 1.15 | 1.0 |
| 6 | 1.10 | 2.0 | 1.15 | 1.8 |

-continued

| | PHYSICAL AND MECHANICAL PROPERTIES OF THE MASS | | | | |
|---|---|---|---|---|---|
| | FRESH MASS | | AFTER 300 CYCLES | | |
| EXAMPLE | FILLING DENSITY T/m³ | CRUSHING GRAIN TO GRAIN Kg/mm | FILLING DENSITY T/m³ | CRUSHING GRAIN TO GRAIN Kg/mm |
| 7 | 1.10 | 1.0++ | (1.60)×× | (0.01)×× |

++Kg F/ball
××After one cycle

| EXAMPLE No. | CONTACT MASS No. | $H_2S$ INPUT % VOL. | $H_2S$ OUTPUT % VOL. | COS + $CS_2$ INPUT % VOL | COS + $CS_2$ OUTPUT % VOL |
|---|---|---|---|---|---|
| 1 | A | 1.8 | 0.020 | 0.2 | 0.06 |
| 2 | B | 1.8 | 0.030 | 0.2 | 0.009 |
| 3 | C | 1.8 | 0.0015 | 0.2 | 0.001 |
| 4 | D | 1.8 | 0.0012 | 0.2 | 0.001 |
| 5 | E | 1.8 | 0.0005 | 0.2 | 0.001 |
| 6 | F | 1.8 | 0.0010 | 0.2 | 0.001 |

The operating conditions (temperature and feed rate) were the same as for absorption with the fresh mass : See Table I.

EXAMPLES 9 – 12 (Comparison)

EXAMPLE 9 (ZnO + CaO)

816 g of ZnO snow type A (loss at 800° C: 2% b.w.) and 210 g of quick lime of 95% CaO content are admixed in a slubber-mixer. 500 ml of water is added which results in an exothermic reaction and the production of slaked lime. The paste is thoroughly mixed (15 minutes) and extruded to 6 mm diameter. The extrudates, 3–8 mm in length, are aged at 60° C for 24 hours in steam, then roasted at 700° C for 2 hours.

960 g of extrudates is obtained, containing 80% ZnO and 20% CaO (as CaO and $CaCO_3$) by weight. These extrudates break under mere finger pressure (crushing strength < 0.1 kg F/mm).

EXAMPLE 10 (ZnO + $Al_2O_3$)

The slubber-mixer of example 9 is used to mix 816 of ZnO snow type A and 300 g of aluminum hydroxide CONDEA of 66.7% b.w. $Al_2O_3$ 0.03% $TiO_2$ and 33.3% $H_2O$. The mixture is damped with 400 ml of an aqueous solution containing 10 ml nitric acid of 65% $HNO_3$ content ($d$ = 1.4). After peptization of alumina (5 minutes mixing), the paste is extruded, aged and roasted as in example 9.

950 g of extrudates is obtained; they contain 80% ZnO and 20% $Al_2O_3$ by weight. Their mechanical strength is weak: 0.5 kg F/mm; as from the first absorption - regeneration cycle, such as described in examples 1 – 7, the extrudates are reduced to dust.

EXAMPLE 11 (ZnO + $Al_2O_3$ + CaO)

816 g of ZnO snow type A and a mixture of 72.9% $Al_2O_3$ and 27.1% CaO by weight (proportions of the major constituents of calcium aluminate SECAR 250), obtained by pre-mixing 218.7 g of aluminum hydroxide CONDEA of 66.7% b.w. $Al_2O_3$ content with 57.05 g of quick lime of 95% b.w. CaO content, are mixed in the slubber-mixer of example 9. 500 ml of water is added, thereby producing slaked lime and forming a homogeneous paste. The latter, after careful mixing (15 minutes) is extruded, aged and roasted as in example 9.

965 g of extrudates is obtained; they contain 80% ZnO, 14.6% $Al_2O_3$ and 5.4% CaO by weight. Their mechanical strength is weak: 0.3 kg F/mm. They break under finger pressure. The X-diffraction shows that less than 10% of calcium oxide is present as calcium aluminate. After the first absorption-regeneration cycle, such as described in examples 1 – 7, the extrudates are reduced to dust.

EXAMPLE 12 (ZnO + calcium aluminate)

The slubber mixer of example 9 is used to mix 816 g of ZnO snow type A and 201 g of SECAR 250 (loss at 800° C: 0.5% b.w.). 450 ml of water is added and the resulting paste is malaxated for 15 minutes and then extruded to a 6 mm diameter. The extrudates of 3 – 8 mm length are aged at 60° C for 24 hours in steam, then roasted at 700° C for 2 hours.

955 g of extrudates containing 80% ZnO and 20% SECAR 250 is obtained, corresponding approximately to 14.6% $Al_2O_3$ and 5.4% CaO. Their mechanical properties are very good: the crushing strength is 2 kg F/mm. X-diffraction shows that calcium and aluminum are in major proportion combined as calcium aluminate.

After 300 cycles of absorption and regeneration, the material has practically unchanged mechanical properties; the crushing strength is 1.8 kg F/mm. The absorption properties are substantially unchanged. The stability of the mechanical and chemical properties is attributable to calcium aluminate.

We claim:

1. A process for purifying a hydrogen sulfide containing gas, characterized in that said gas is passed in contact with an adsorption material comprising a shaped, substantially homogeneous intimate mixture providing by weight, 20–85% of zinc oxide, 0.9–50% of alumina, 0–30% of silica, and 2–45% of group IIA metal oxide, said mixture having been roasted at 500°–1000° C. for a stability increasing time so that at least 50% of said group IIA metal oxide is combined with alumina as metal IIA aluminate or silico-aluminate, and the major portion of said zinc oxide is uncombined with the other components of the absorption material, to absorb hydrogen sulfide, then the contact of the gas with the material is interrupted and an oxygen containing gas is passed in contact with the material for regeneration thereof, the passage is interrupted and a hydrogen sulfide containing gas is passed again in contact with the regenerated material.

2. A process according to claim 1, wherein the zinc oxide content is 25 – 80% b.w.

3. A process according to claim 1, wherein the absorption material also contains 0.1 – 10% b.w. as oxide, of at least one oxide of at least one metal M which is copper, cadmium, titanium, zirconium, vanadium, chromium, molybdenum, tungsten, manganese, iron, cobalt or nickel.

4. A process according to claim 1, wherein the material consists essentially of, by weight, 25 – 80% zinc oxide, 9 – 50% aluminum oxide, 0.02 – 6% silica and 3.5 – 26% of a group II A metal oxide, the molar ratio of the group II A metal oxide to both the aluminum and silicon oxides being from 0.3 : 1 to 2 : 1.

5. A process according to claim 4, wherein the material also contains 0.1 – 10% b.w. of metal M oxide, and M is copper, cadmium, titanium, zirconium, vanadium, chromium, molybdenum, tungsten, manganese, iron, cobalt or nickel.

6. A process according to claim 1, wherein the material consists essentially of:

ZnO: 25 – 80% CaO 3 – 30%
$Al_2O_3$: 2 – 24% oxides of metals M: 0.01 – 10%
$SiO_2$: 5 – 30% $Al_2O_3$ + $SiO_2$ + CaO = 15 – 60%
    M is copper, cadmium, titanium, zirconium, vanadium, chromium, molybdenum, tungsten, manganese, iron, cobalt or nickel.

7. A process according to claim 1, wherein the material is in the form of grains of 3 – 8 mm diameter, its filling density in an industrial reactor is 0.8 – 1.4 metric ton/m3, its crushing strength, is higher than 1 kg/mm, its porosity, as determined by mercury porosimetry, is 15 – 50 ml/kg, its average pore diameter is 1000 – 10,000 A and its specific surface ranges from 1 to 60 $m^2g^{-1}$.

8. A process according to any of claims 1, wherein the gas containing hydrogen sulfide is contacted with the material at 300° – 650° C and the gas containing oxygen is contacted with the material at 450° – 900° C.

9. A process according to any of claims 1, wherein the gas containing hydrogen sulfide also contains carbon sulfide and carbon oxysulfide.

10. A process according to any of claims 1, wherein the gas containing hydrogen sulfide is an effluent from a unit for gasifying solid, liquid or gaseous combustibles.

11. A process according to any of claims 1, wherein the gas to be treated contains sulfur compounds and at least 10% by mole of hydrogen and/or carbon monoxide, the gas discharged from the absorption step for the sulfur compounds is admixed with the gas discharged from the regeneration step, passed to a catalyst for $SO_2$ reduction and treated in a plant for sulfur production.

12. Contact material to carry out hhe process of claim 1, comprising a shaped, substantially homogeneous intimate mixture providing by weight, 20–85% zinc oxide, 0.9–50% of alumina, 0–30% of silica, and 2–45% of a group IIA metal oxide, said mixture having been roasted at 500°–1000° C. for a stability increasing time so that at least 50% of said group IIA metal oxide is combined with alumina as a metal IIA aluminate or silico-aluminate, and the major portion of said zinc oxide is uncombined with the other components of the contact material.

13. Contact material according to claim 12, wherein the material consists essentially of by weight:

ZnO: 25 – 80% CaO 3 – 30%
$Al_2O_3$: 2 – 24% oxides of metals M: 0.01 – 10%
$SiO_2$: 5 – 30% $Al_2O_3$ + $SiO_2$ + CaO = 15 – 60%
    M is copper, cadmium, titanium, zirconium, vanadium, chromium, molybdenum, tungsten, manganese, iron, cobalt or nickel, and wherein the material is in the form of grains of 3–8 mm diameter, its filling density in an industrial reactor is 0.8 – 1.4 metric ton/m3, its crushing strength is higher than 1 kg/mm, its porosity, as determined by mercury porosimetry, is 15 – 50 ml/kg, its average pore diameter is 1000 – 10,000 A and its specific surface ranges from 1 to 60 $m^2g^{-1}$.

14. A process according to claim 1, wherein said adsorption material contains metal IIA aluminate or silico-aluminate prior to roasting the mixture at 500°–1000° C.

15. A contact material according to claim 12, wherein the contact material contains metal IIA aluminate or silico-aluminate prior to roasting the mixture at 500°–1000° C.

* * * * *

UNITED STATES PATENT AND TRADEMARK OFFICE
CERTIFICATE OF CORRECTION

PATENT NO. : 4,088,736
DATED : May 9, 1978
INVENTOR(S) : COURTY, ET AL.

It is certified that error appears in the above-identified patent and that said Letters Patent are hereby corrected as shown below:

Claims 8 - 11:read "a process according to any Claims 1" should read--a process according to Claim 1--.

Signed and Sealed this

Third Day of October 1978

[SEAL]

Attest:

RUTH C. MASON
Attesting Officer

DONALD W. BANNER
Commissioner of Patents and Trademarks